(12) United States Patent
Chapdelaine et al.

(10) Patent No.: US 12,346,013 B2
(45) Date of Patent: Jul. 1, 2025

(54) SEATS WITH DISPLAY SYSTEMS

(71) Applicant: Textron Innovations Inc., Providence, RI (US)

(72) Inventors: Mathew Chapdelaine, Fort Worth, TX (US); Cameron Ayres, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/746,505

(22) Filed: May 17, 2022

(65) Prior Publication Data

US 2022/0363394 A1 Nov. 17, 2022

Related U.S. Application Data

(60) Provisional application No. 63/189,680, filed on May 17, 2021.

(51) Int. Cl.
| | |
|---|---|
| *G03B 21/00* | (2006.01) |
| *B64D 11/00* | (2006.01) |
| *B64D 11/06* | (2006.01) |
| *G02B 27/01* | (2006.01) |
| *G03B 21/56* | (2006.01) |
| *G03B 23/00* | (2006.01) |
| *G09G 3/00* | (2006.01) |

(52) U.S. Cl.
CPC ........ *G03B 21/00* (2013.01); *B64D 11/00151* (2014.12); *B64D 11/0606* (2014.12); *G02B 27/0103* (2013.01); *G03B 21/56* (2013.01); *G03B 23/00* (2013.01); *G09G 3/001* (2013.01)

(58) Field of Classification Search
CPC .............. B64D 11/00151; B64D 11/06; G02B 27/0103; G03B 23/00; G09G 3/001
See application file for complete search history.

(56) References Cited

U.S. PATENT DOCUMENTS

| | | | |
|---|---|---|---|
| 2014/0192268 A1* | 7/2014 | Petrisor | B60Q 3/44 348/744 |
| 2017/0305093 A1* | 10/2017 | Ziolek | B29C 64/171 |
| 2020/0094985 A1* | 3/2020 | Quatmann | B64D 11/00151 |
| 2021/0332528 A1* | 10/2021 | Liao | D06N 3/0043 |
| 2021/0362636 A1* | 11/2021 | Di Censo | B60R 21/08 |

\* cited by examiner

*Primary Examiner* — Lisa S Landis
(74) *Attorney, Agent, or Firm* — Lightfoot & Alford PLLC

(57) ABSTRACT

An aircraft has a seat that has at least one of (1) a nonplanar back surface profile and a touch sensitive film display system carried by the seat and configured to conform to the nonplanar back surface profile and (2) a privacy screen selectively stowed within an interior of the seat. An aircraft has a pilot seat, a passenger seat disposed aft relative to the pilot seat, and a holographic display system configured to project a holographic image in a space between the pilot seat and the passenger seat.

16 Claims, 16 Drawing Sheets

SEATS WITH DISPLAY SYSTEMS

BACKGROUND

Aircraft comprise cabins and cockpits that comprise not only seats for pilots and passengers, but also, information display systems and components associated with seats for reducing transient force transference to users of the seats. There is a need for aircraft seat systems with improved force isolation, personal privacy, and integrated display system features for saving cabin and cockpit space.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
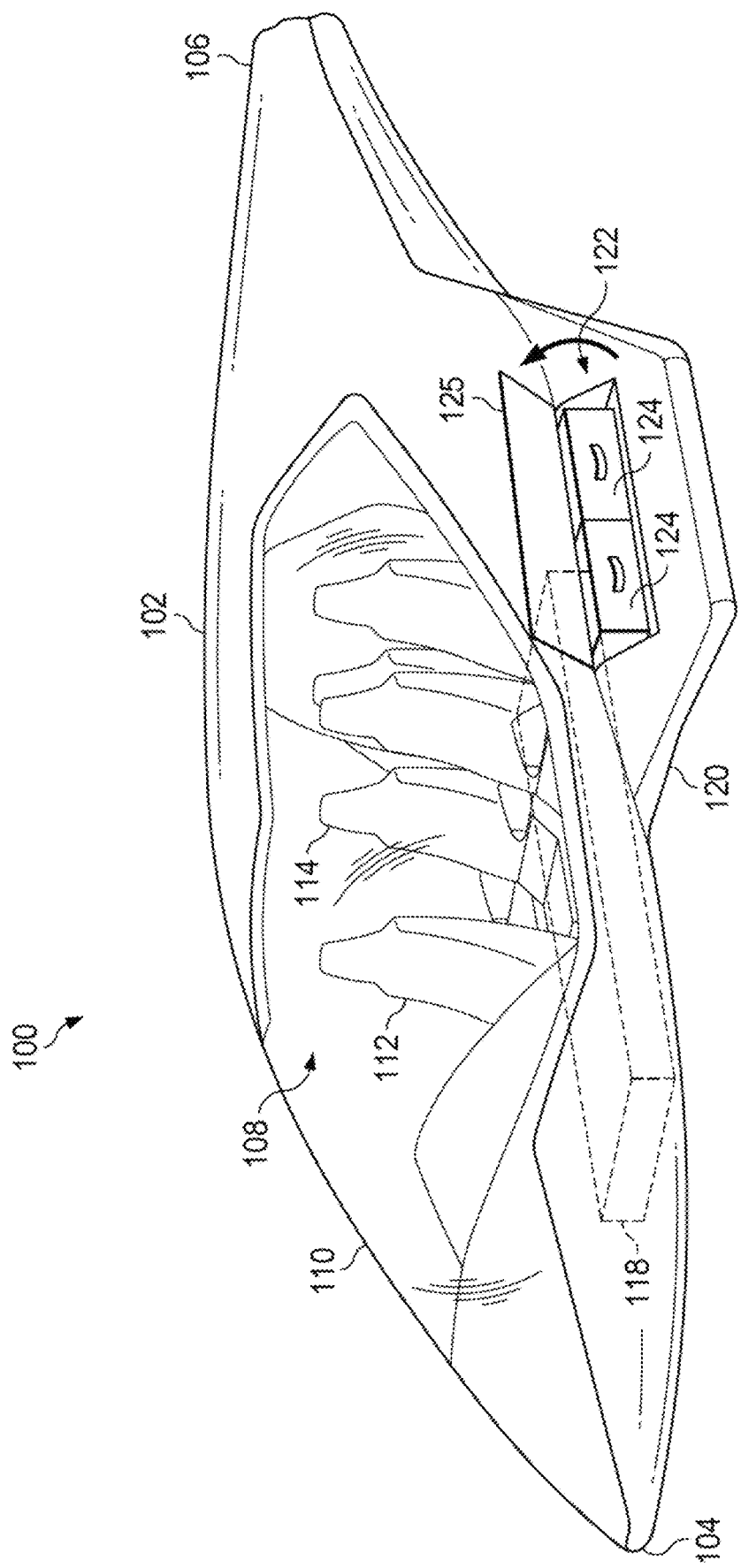
FIG. 1 is an oblique view of a portion of an aircraft according to an embodiment of this disclosure.
Figure 2:
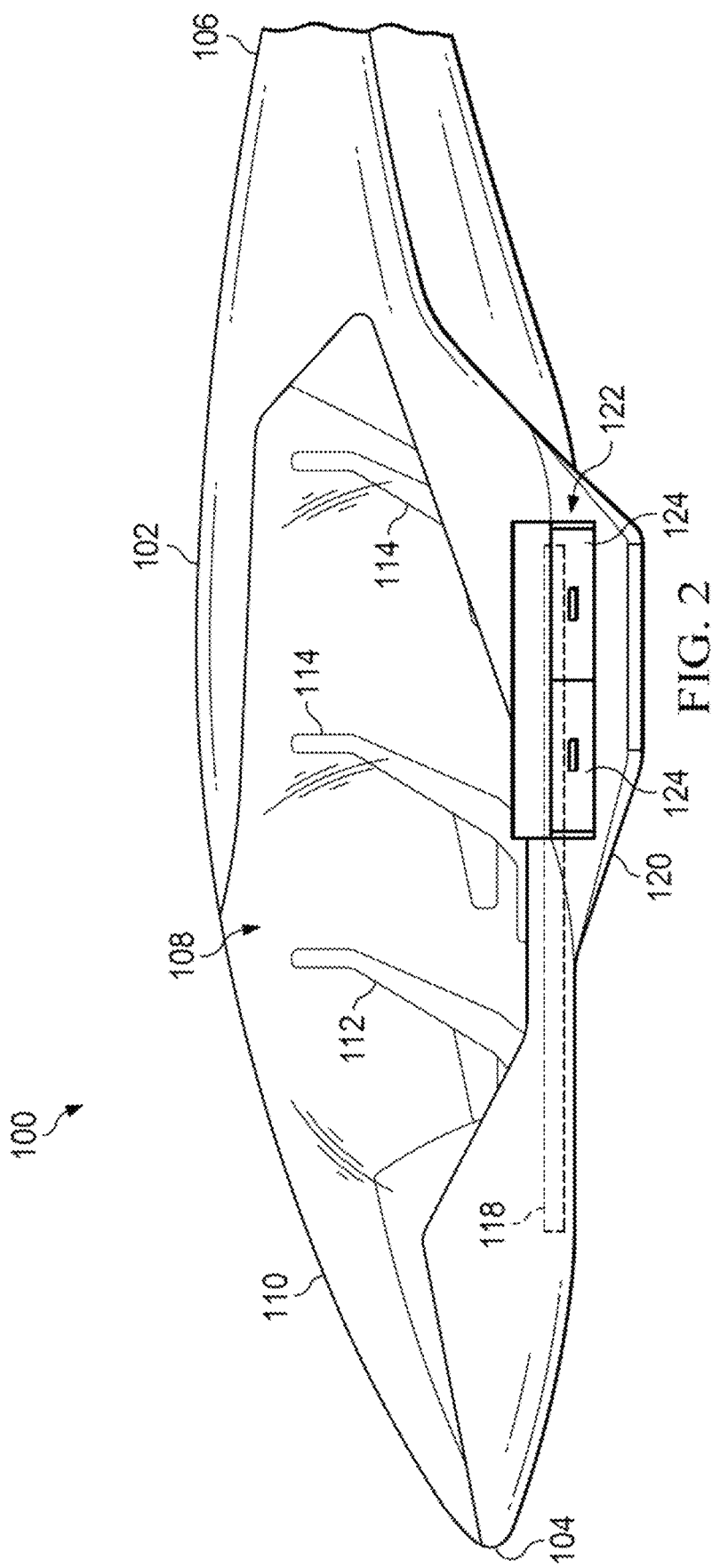
FIG. 2 is a side view of the aircraft of FIG. 1.
Figure 3:
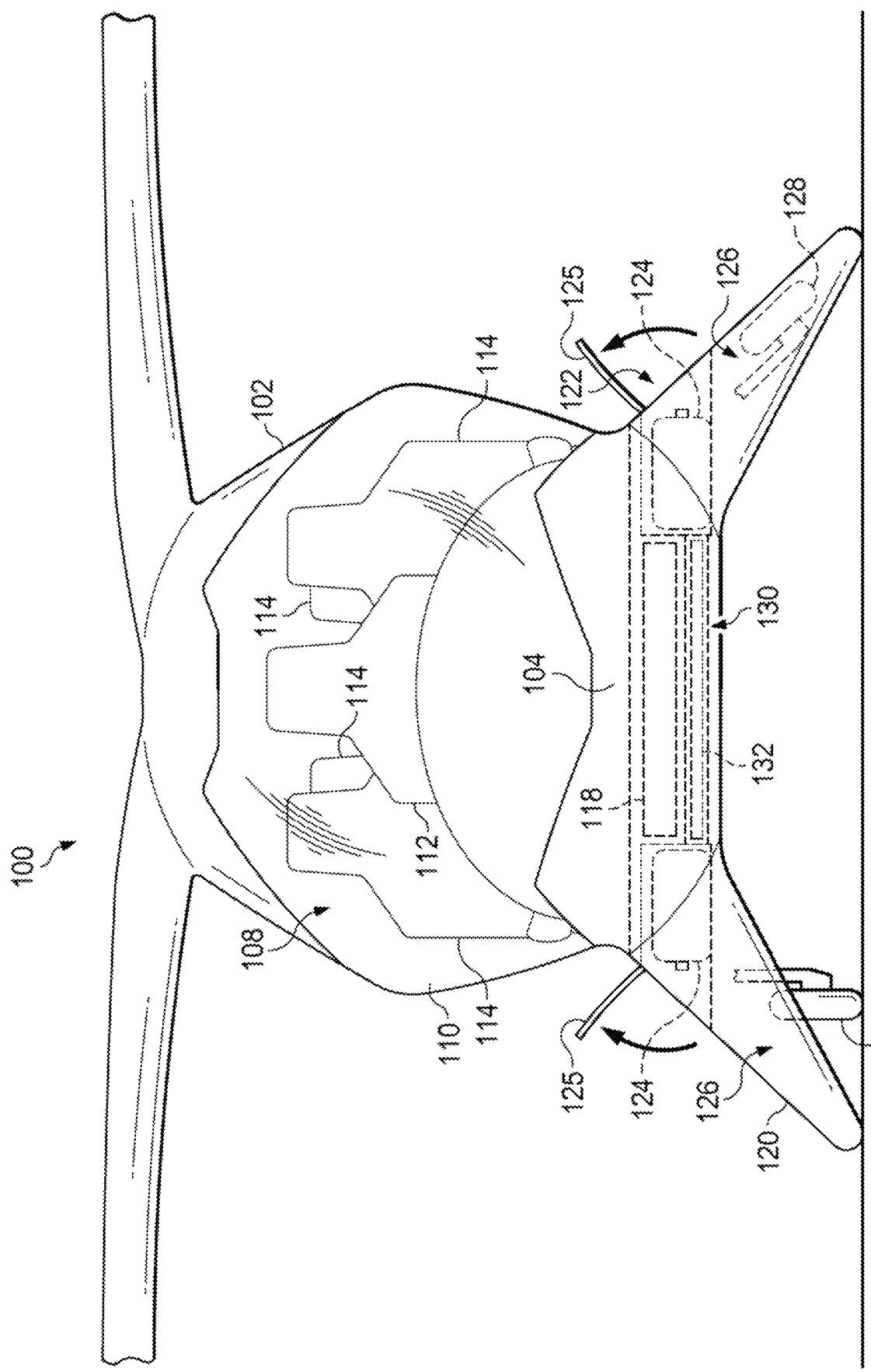
FIG. 3 is a front view of the aircraft of FIG. 1.

Referring to FIGS. 1-3 in the drawings, an aircraft 100 is illustrated. Aircraft 100 comprises a fuselage 102 having a nose 104 and a tail 106, a cabin 108, a window 110, a pilot seat 112, and passenger seats 114. In this embodiment, aircraft 100 comprises an electric vertical takeoff and landing (eVTOL) aircraft but the propulsion systems are not shown. It will be appreciated that, in some cases, aircraft 100 can comprise rotor systems comprising electric motors that are powered by a battery system 118. Aircraft 100 further comprises a base structure 120 generally disposed between the cabin 108 and the ground. In this embodiment, base structure 120 comprises an interior cargo space 122 configured to receive luggage 124 or other cargo. Cargo spaces 122 can be closed in by operating rotatable doors 125. Base structure 120 also comprises an interior space 126 configured to receive at least a portion of a retractable landing gear 128. Still further, an appropriately sized wheelchair space 130 is provided laterally between the cargo spaces 122, and the space 130 is configured to house a conventionally sized and shaped collapsed or folded wheelchair 132.

With aircraft generally, and particularly with regard to eVTOL aircraft such as aircraft 100, cabin space is highly limited to minimize overall aircraft weight. Also, cabin arrangements are highly scrutinized for safety hazards. One well-known conventional hazard is locating luggage, wheelchairs, and other accessories/cargo in the same interior space as passengers. In some situations, the cargo can be dislodged from secure storage and become projectiles or otherwise present a threat to passengers and pilots of a small cabin. Accordingly, in this embodiment, the cargo is safely stored away from passengers in the segregated cargo space 122 within base structure 120. In this embodiment, the base structure 120 houses both passenger luggage and aircraft landing gear. This simplifies and increases the interior passenger compartment without the need for cabin luggage compartments. Most generally, the base structure 120 is functional as a storage pod that allows for a less cluttered cabin space and higher cabin safety by offering cargo storage external to the cabin. Another feature of the base structure 120 is that the cargo space 122 extends laterally across the entirety of the aircraft 100 so that cargo loaded on one side of the aircraft 100 can be accessed and/or removed through the opposite side. In some cases, the cargo space 122 can be provided with additional aircraft equipment, such as additional fuel and/or batteries or contents that can contribute to the functioning of the aircraft 100. In some embodiments, window 110 can comprise an automatic tinting system configured to selectively provide shading from exterior light. In some cases, the automatic tinting system can operate to maintain a desired maximum in-cabin brightness while in other cases, the tinting may be manually managed.

Figure 4:
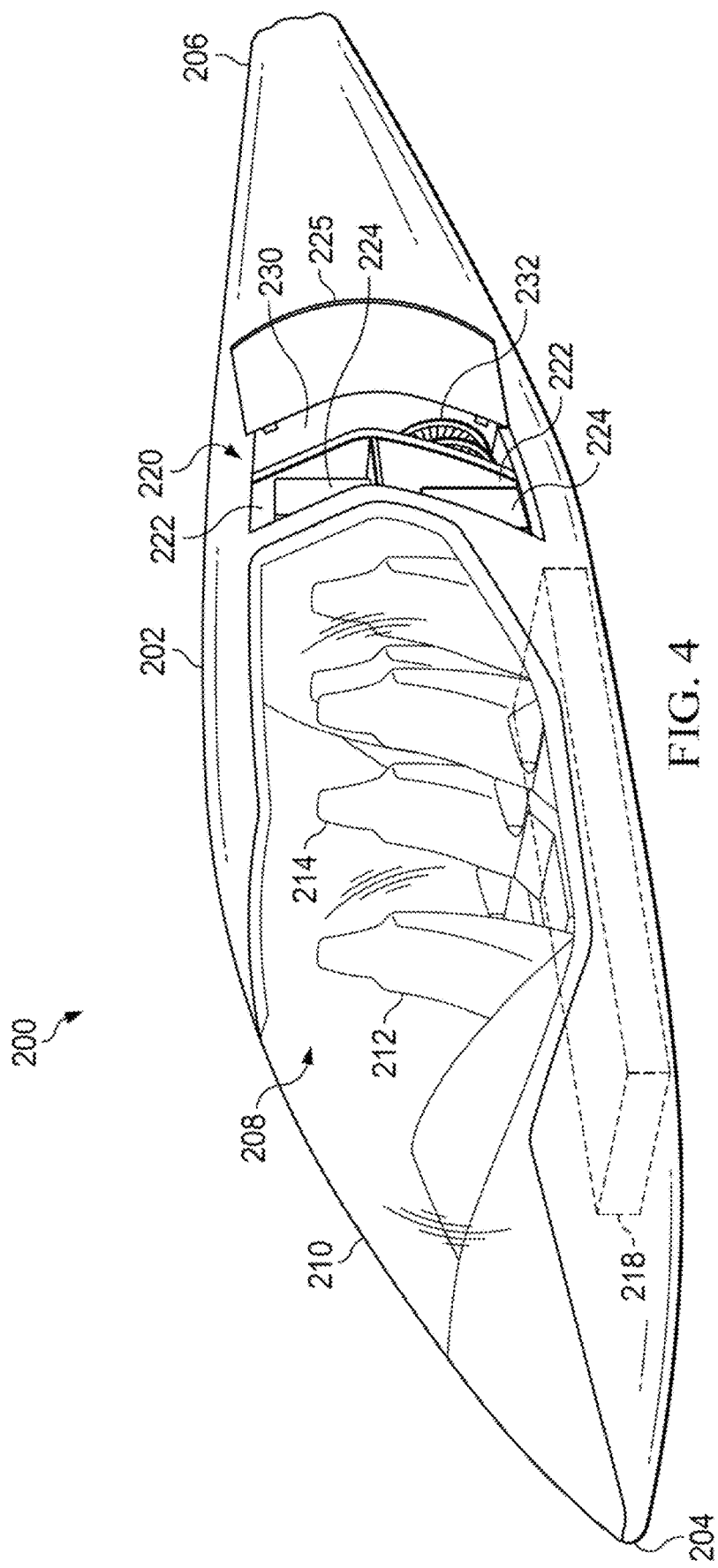
FIG. 4 is an oblique view of a portion of an aircraft according to another embodiment of this disclosure.
Figure 5:
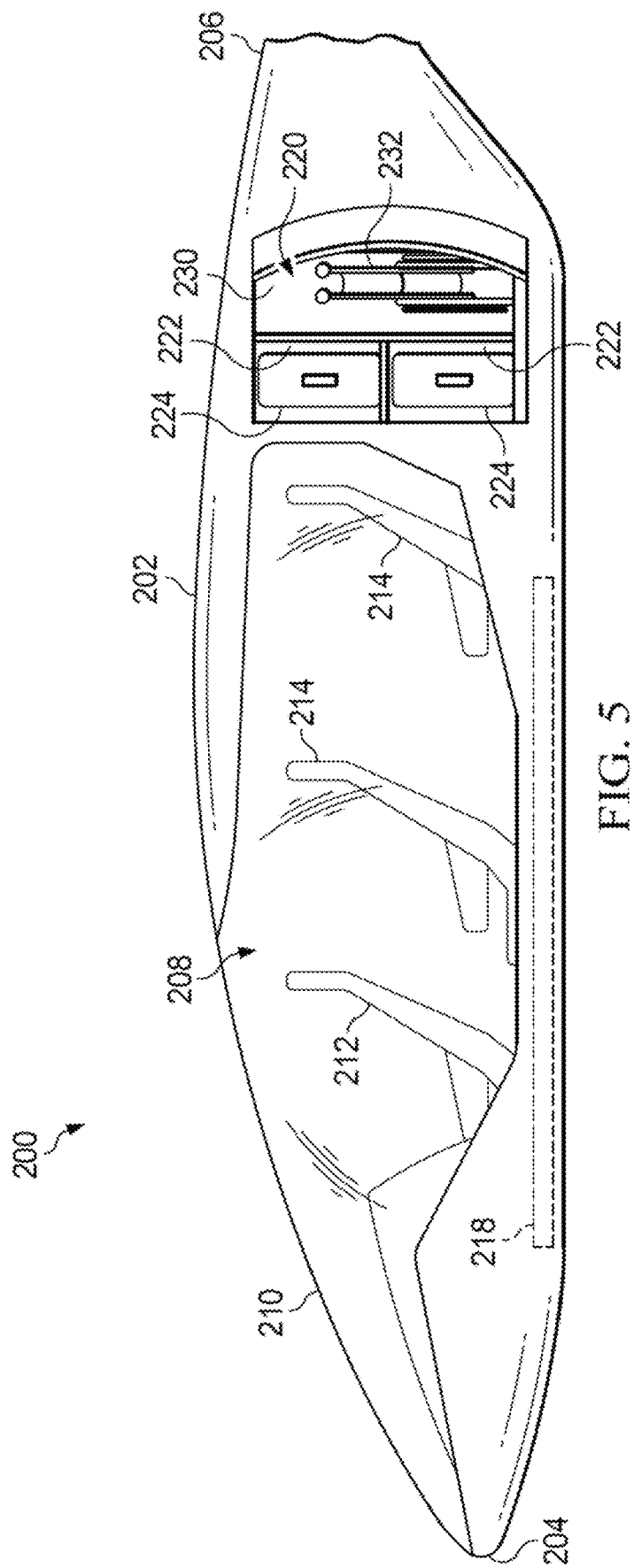
FIG. 5 is a side view of the aircraft of FIG. 4.
Figure 6:
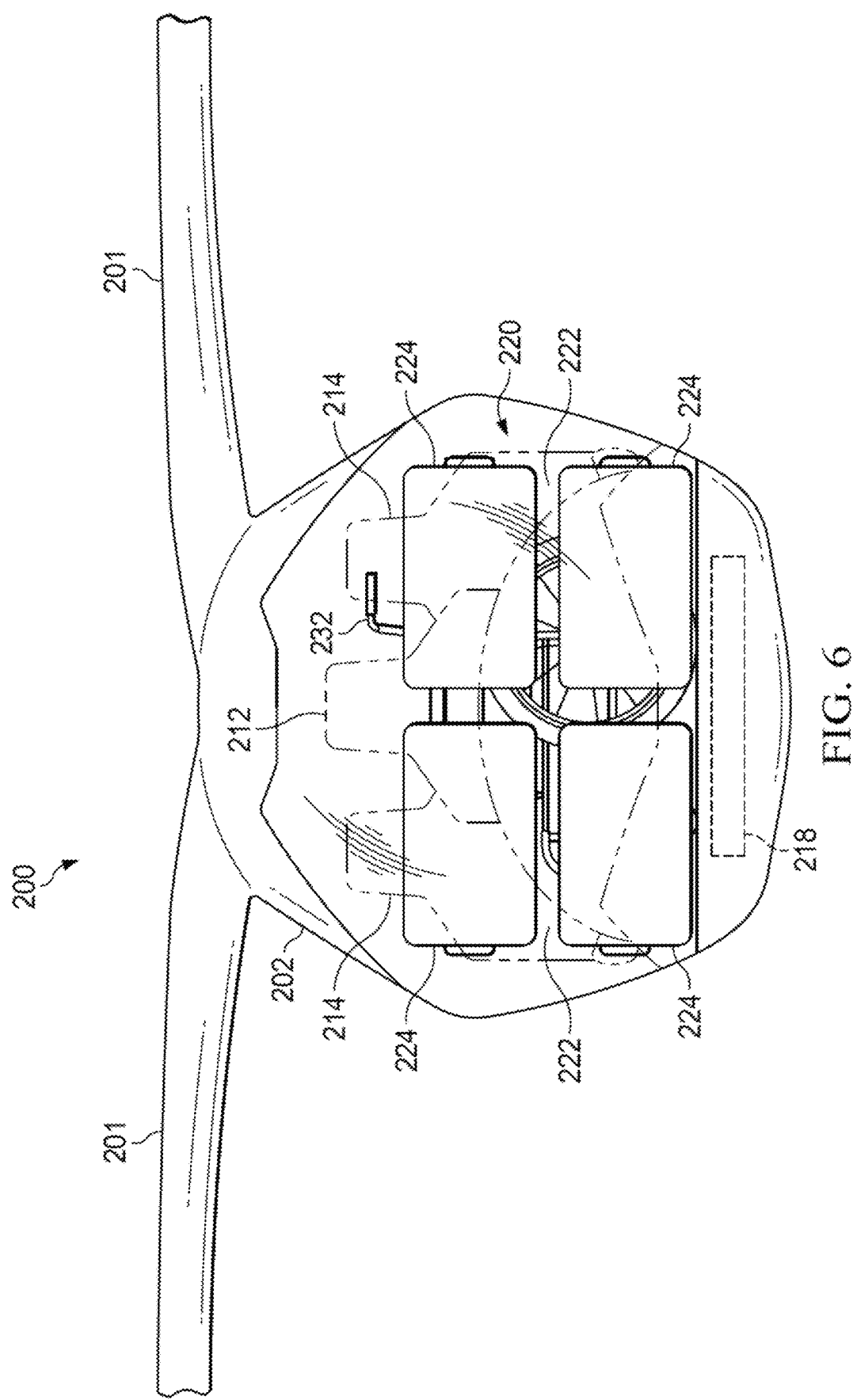
FIG. 6 is a front view of the aircraft of FIG. 4.

Referring now to FIGS. 4-6 in the drawings, an aircraft 200 is illustrated. Aircraft 200 comprises wings 201, a fuselage 202 having a nose 204 and a tail 206, a cabin 208, a window 210, a pilot seat 212, and passenger seats 214. In this embodiment, aircraft 200 comprises an electric vertical takeoff and landing (eVTOL) aircraft but the propulsion systems are not shown. It will be appreciated that, in some cases, aircraft 200 can comprise rotor systems comprising electric motors that are powered by a battery system 218. Aircraft 200 further comprises an aft storage compartment 220 generally disposed between the cabin 208 and the tail 206. In this embodiment, storage compartment 220 comprises an interior cargo space 222 configured to receive luggage 224 or other cargo. Cargo spaces 222. Storage compartment 220 also comprises an appropriately sized wheelchair space 230 provided in an aft portion of the storage compartment. Wheelchair space 230 is configured to house a conventionally sized and shaped collapsed or folded wheelchair 232. Accordingly, in this embodiment, the luggage 224 and wheelchair 232 are safely stored away from passengers in the segregated storage compartment 220. In this embodiment, battery system 218 is disposed beneath the cabin 208, but in alternative embodiments, the battery system may additionally or instead be located beneath the storage compartment 220. Most generally, the storage compartment 220 is functional as a storage space that allows for a less cluttered cabin space and higher cabin safety by offering cargo storage external to the cabin. In this embodiment, the interior cargo space 222 extends laterally across the entire aircraft so that cargo space 222 can accessed from either side of the aircraft 200. Access to the interior cargo space 222 and the wheelchair space 230 can be controlled by opening and closing rotatable doors 225 on each side of the aircraft 200.

Figure 7:
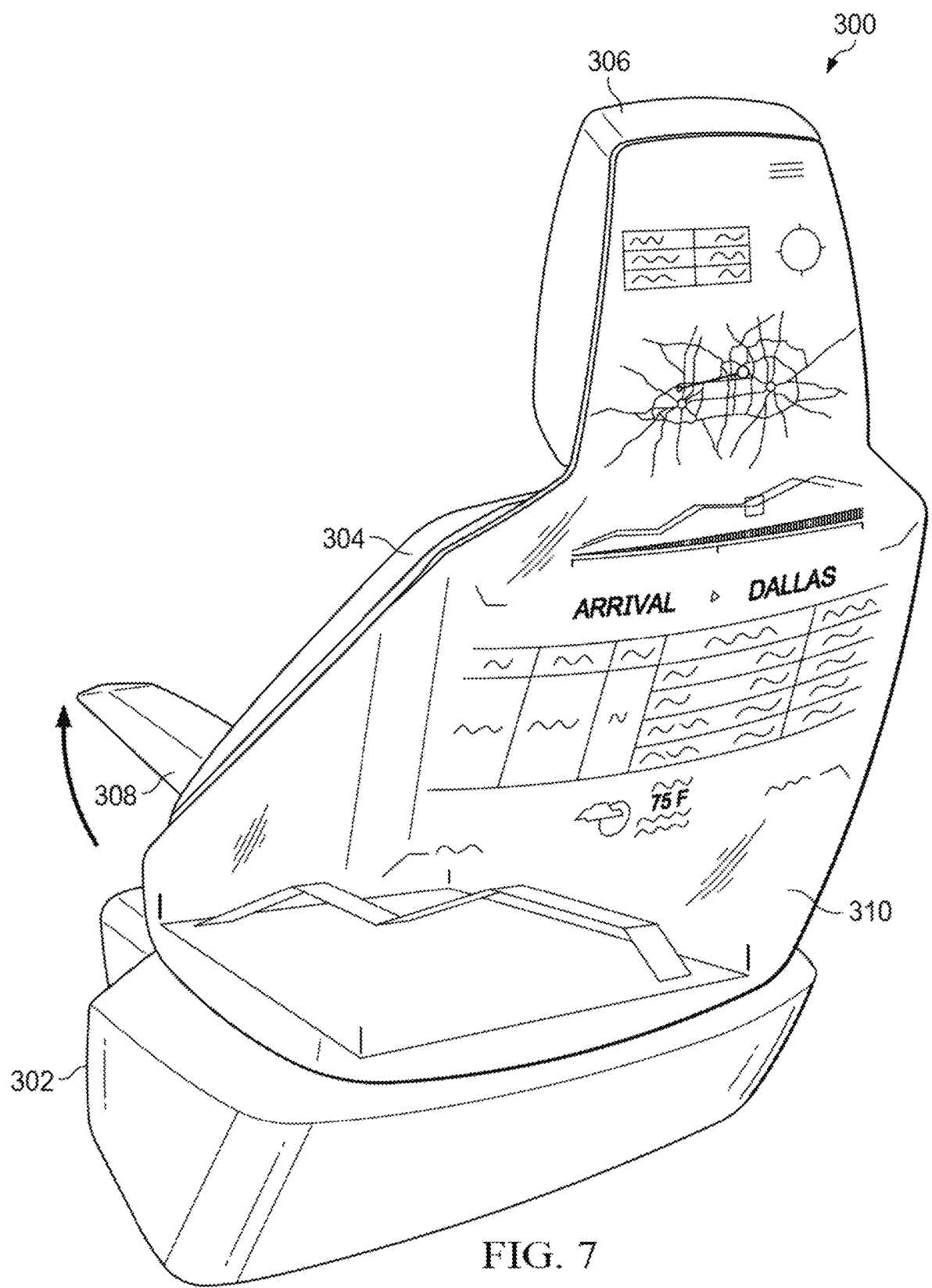
FIG. 7 is an oblique view of a seat according to an embodiment of this disclosure.

Referring now to FIG. 7, a seat 300 is shown. Seat 300 comprises a base 302, a back rest 304, a head rest 306, and a rotatable arm rest 308. One or more of the base 302, back rest 304, and head rest 306 may be substantially integrally formed with each other. Seat 300 further comprises a film display system 310 carried by a back surface of seat 300. Conventional visual communication or entertainment for inflight aircraft systems typically use a single small screen behind a headrest or retractable ceiling monitor/screen along with all the housing parts and retractable mechanical parts required. Seat 300 provides a greater display area than the small head rest screens and further, because seat 300 comprises film display system 310, the conventional costly installation of video displays as well as the requirement maintenance can be avoided. Film display system 310 provides a vastly increased the screen size and visibility by covering the entire back of the seat in addition to being viewable on three sides of the seats 300. Providing seats 300 rather than conventional display systems offers a substantial reduction in manufacturing time, cost, and weight and also allows savings with this new visual screen approach. In this embodiment, film display system 310 comprises a touch sensitive film screen that wraps the full back of the seat 300 and is viewable on three sides. Seat 300 offers a variety of viewing angles for inflight entertainment and/or emergency situations. Film display systems 310 can be used to display entertainment or instructions, such as aircraft boarding instruction viewable from both inside and outside the aircraft. The lower weight of a film display system as compared to existing inflight video display systems allows higher flight efficiency.

Seat 300 can be utilized with sensors and/or other hardware and software to offer a personalized viewing experience. For example, a sensor can be used to track a location of a viewer's eyes so that graphics displayed along the curved back of the seat 300 can be actively controlled to provide a consistent graphical representation even as a passenger moves about the cabin. As mentioned previously, data regarding the flight and/or unrelated entertainment media can be displayed by the seat 300.

Figure 8:
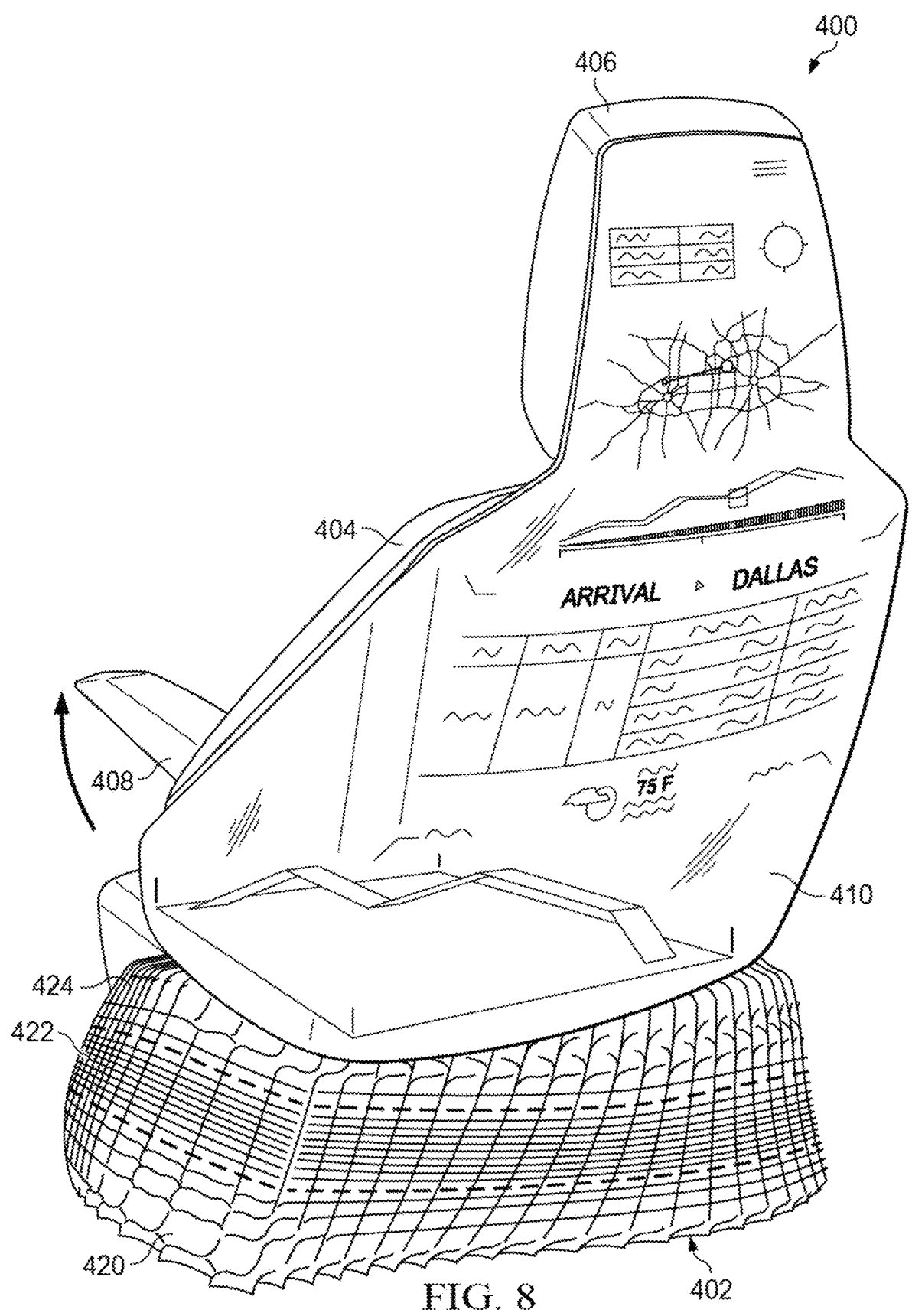
FIG. 8 is an oblique view of a seat base according to an embodiment of this disclosure.

Referring now to FIG. 8, a seat 400 is shown. Seat 400 comprises a base 402, a back rest 404, a head rest 406, and a rotatable arm rest 408. One or more of the base 402, back rest 404, and head rest 406 may be substantially integrally formed with each other. Seat 400 further comprises a film display system 410 carried by a back surface of seat 400. Seat 400 is substantially similar to seat 300 but the base 402 is different than base 302.

Conventional aircraft impact protection typically comprises either an X-frame or a telescopic mechanical system for compression and shock absorption. Traditional materials and manufacturing are lengthy and costly. Base 402 is a revolutionary system for impact protection through the use of 3D printed material(s) and through a zonal approach to creating varying densities of specific impact absorbing structures. This new approach is more cost effective, faster to manufacture, lighter weight for the aircraft, and ultimately offers increased passenger safety in emergency situations. Some of the shapes and or structures of base 402 can comprise optimized organic structures engineered for impact protection. The seat 400 uses 3D printed parametric structures to provide improved impact/hard landing protection. Zonal engineering techniques can be applied to the base 402 structure. Zones of the base 402 can comprise zones with different or graduated densities to optimize impact protection using specific materials and zonally engineered crash structure(s) with varying densities of printed material. Seat 400 can be used in concert with legacy crash protection systems or may fully replace such systems. Providing the base 402 as a 3D printed crash structure with zonal densities generated by parametric modeling/engineering increases passenger impact protection. As compared to a conventional seat base, base 402 can be lighter thereby yielding increased flight efficiency. Because the seat 400 can obviate the need for traditional impact protection systems, an aircraft can be provided that has a reduced number of parts and lower manufacturing costs. In some embodiments, base 402 can be provided with active control elements, such as, but not limited to, linear actuators controlled to compensate for inflight movements. A seat 400 could therefore be used to substantially isolate a passenger from significant inflight disturbances.

In this embodiment, base 402 comprises a bottom zone 420, a middle zone 422, and an upper zone 424, all integrally formed via 3D printing. In some cases, the material and/or material properties of the various zones can be provided to have different compression, tensile, impact, and bending responses, each being primarily selected to provide a passenger with a comfortable flight under normal flight conditions and added protection in cases of hard landings.

Figure 9:
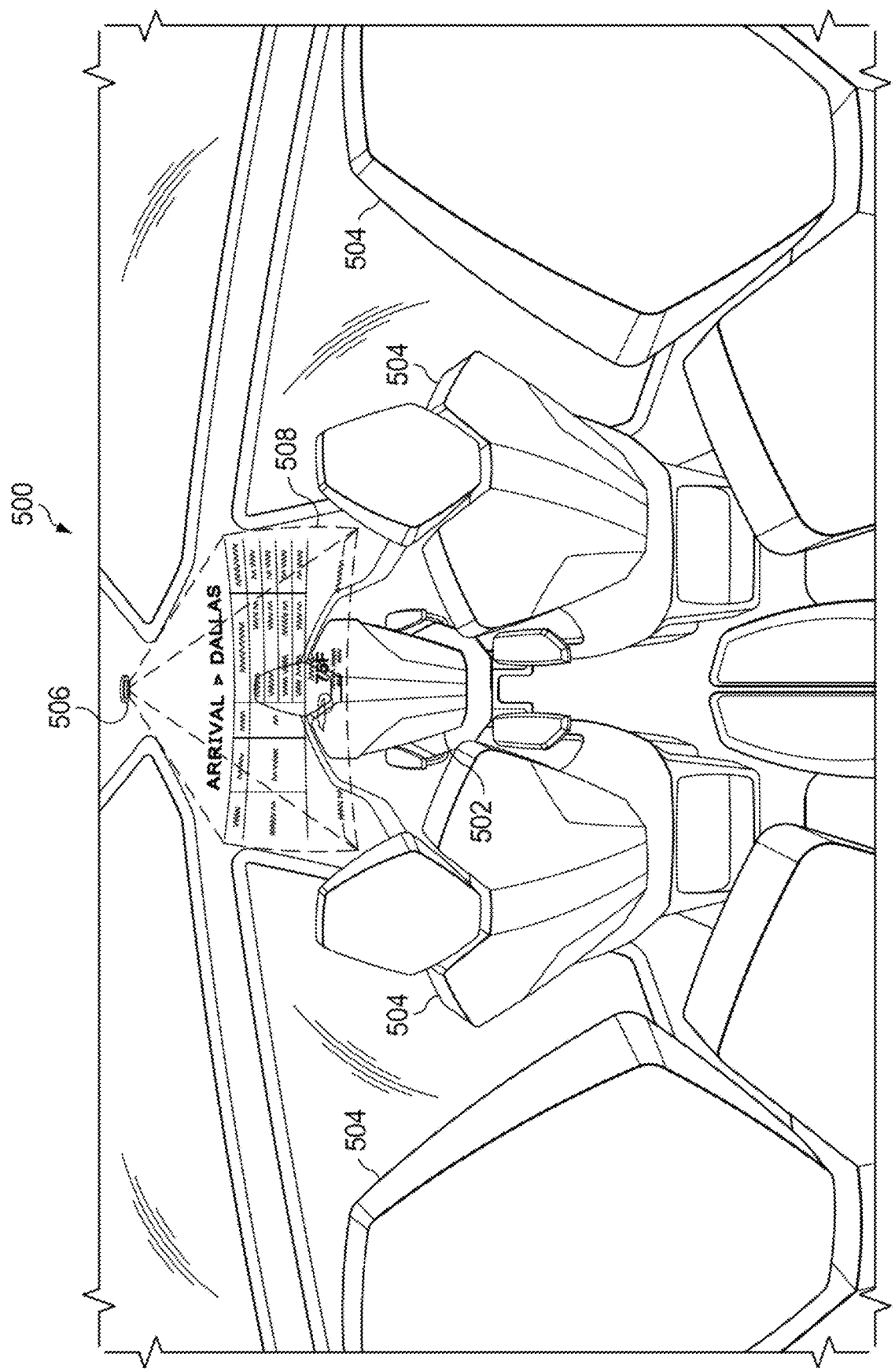
FIG. 9 is a view of an holographic display system within an aircraft according to an embodiment of this disclosure.

Referring now to FIG. 9, an aircraft 500 is shown as comprising a pilot seat 502, passenger seats 504, and a holographic display system 506. In operation, the holographic display system 506 is configured to display a holographic image 508 aft of the pilot seat 502 and forward relative to the passenger seats 504. In this case, the holographic image 508 comprises flight specific information, such as flight arrival information. The holographic display system 506 can be used not only to entertain passengers but also to communicate flight related information or instructions to passengers. Holographic display system 506 reduces the number of screens needed on the back of flights seats or retractable screen ceiling housings. Holographic projection increases inflight visual communication, reducing total manufacturing cost, complexity and weight for the aircraft. In this embodiment, holographic display system 506 can provide a large centrally located display for information that increases passenger awareness and communication in all flight and ground situations.

Figure 10:
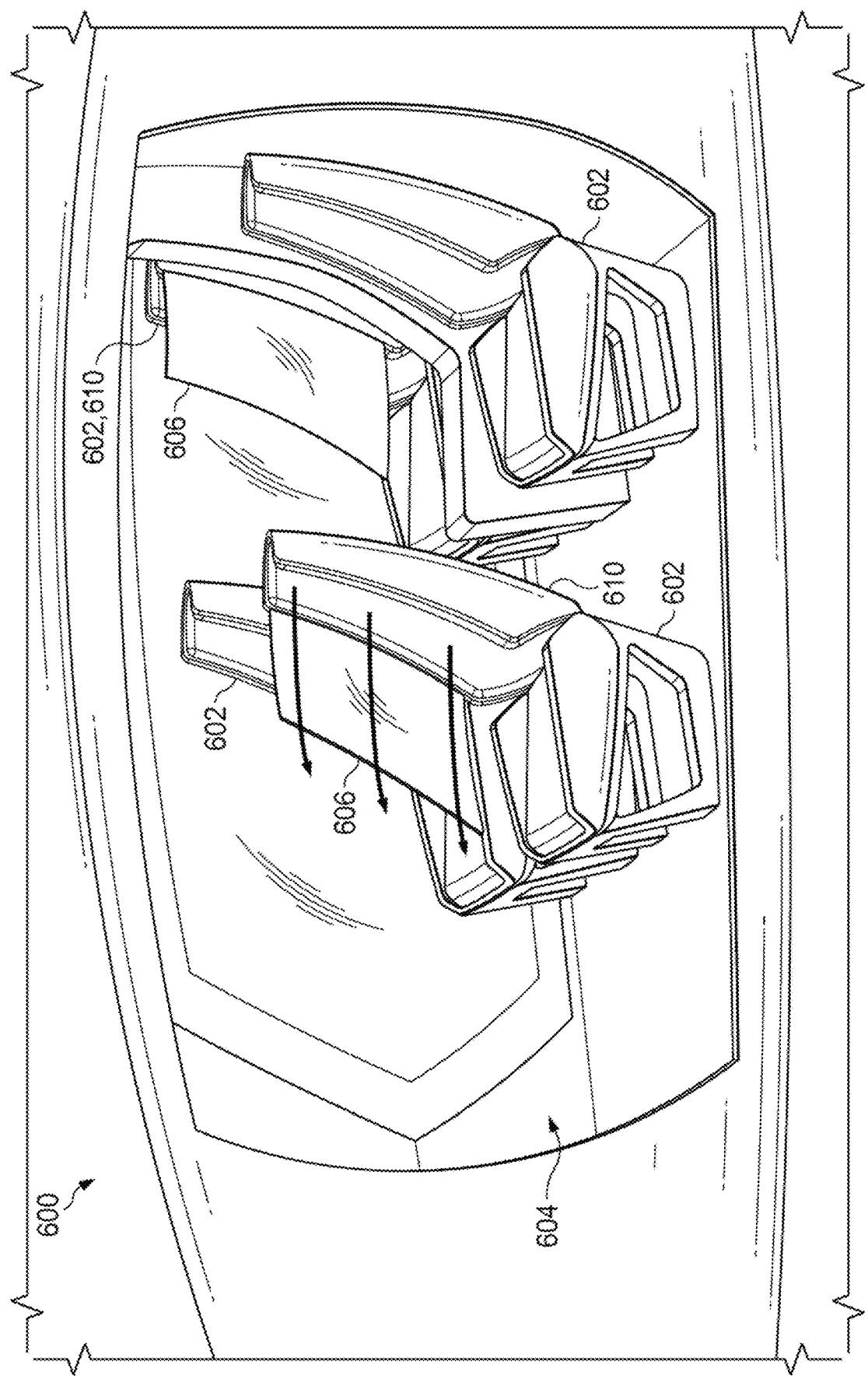
FIG. 10 is an oblique view of an aircraft interior according to an embodiment of this disclosure.
Figure 11:
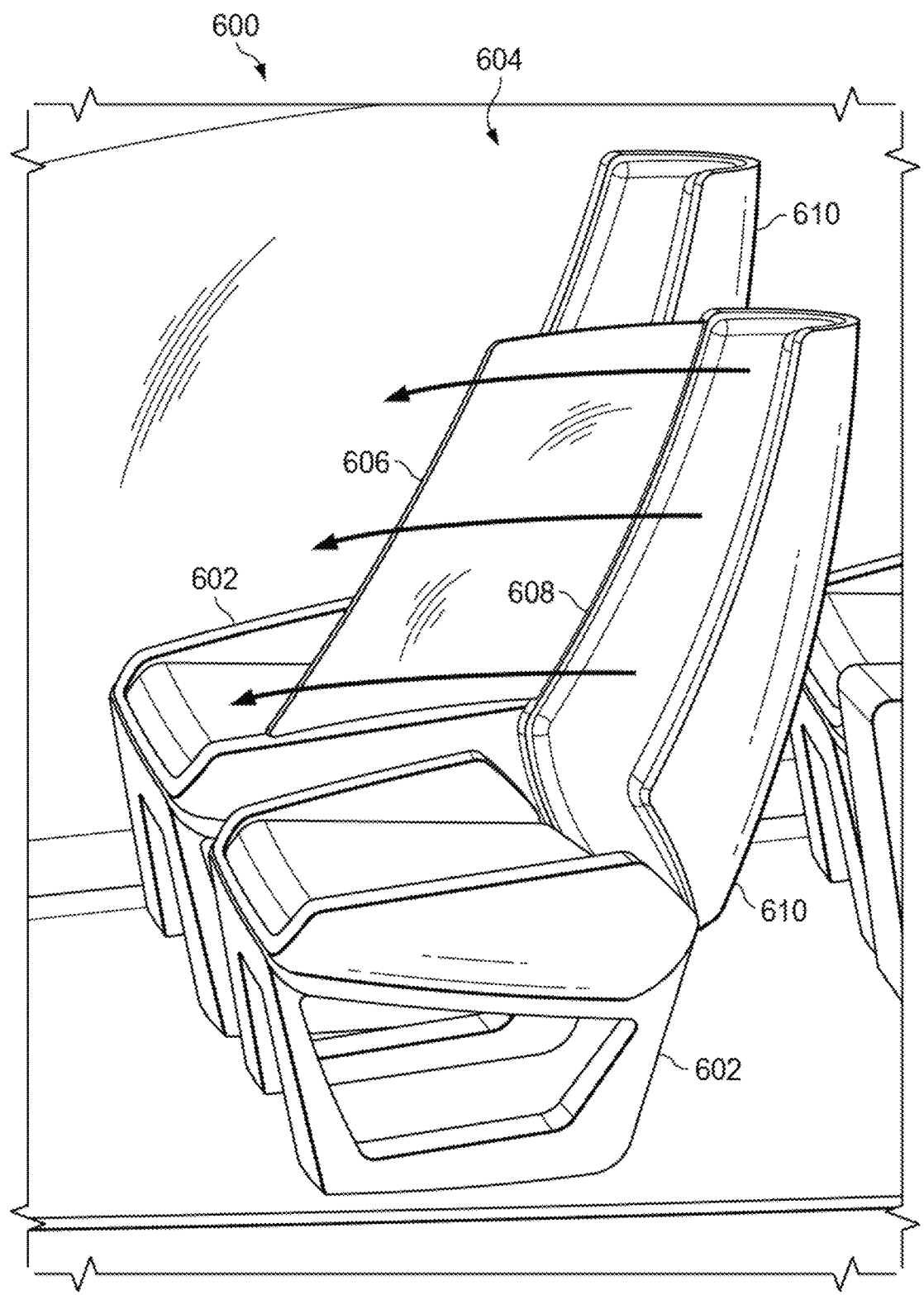
FIG. 11 is an oblique view of a seat according to an embodiment of this disclosure.
Figure 12:
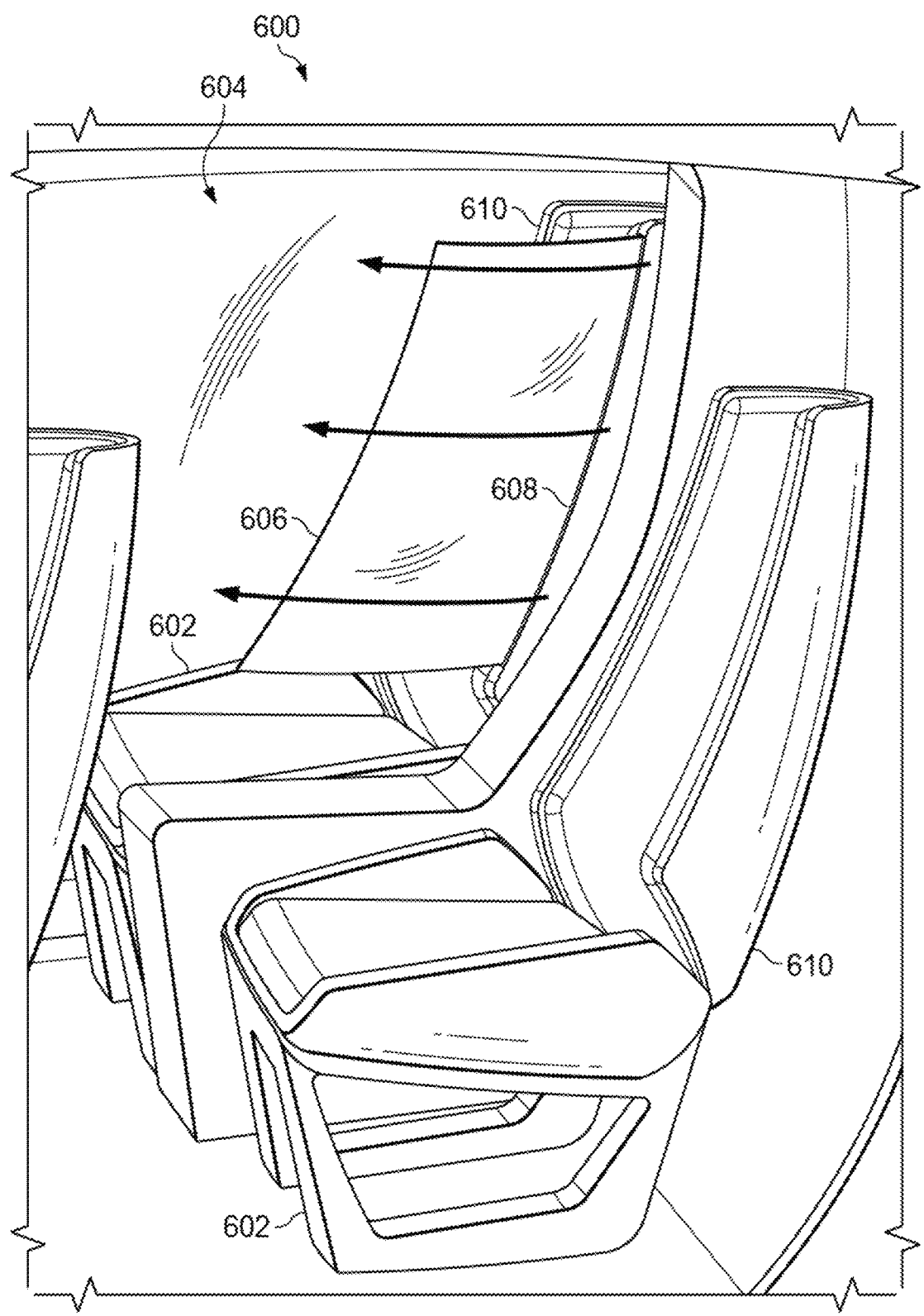
FIG. 12 is an oblique view of another seat according to an embodiment of this disclosure.

Referring now to FIGS. 10-12, an aircraft 600 is shown as comprising two rows of passenger seats 602. As explained above, in some cases, space within a cabin 604 can be very limited and can offer very limited privacy between passengers. Conventional aircraft cabin seats for smaller aircraft do not offer a substantial amount of privacy for occupants. Accordingly, aircraft 600 is supplied with retractable privacy screens 606. In this embodiment, the privacy screens 606 can be carried on tracks within storage pockets 608 of seats 602. In this embodiment, the storage pockets 608 are located within a seat back 610 of the seat 602. However, in alternative embodiments, privacy screens may take other shapes and can similarly be selectively stored within the seat 602.

Privacy screens 606 can be deployed by the passenger at will for visual as well as sound obfuscation, so that for example, a passenger may make a phone call relatively privately where facial expressions and voice is not discernable by other passengers. This provides for a more private, pleasant and personalized flight for each passenger. Retractable privacy screens 606 are built into the back of the aircraft seat. The privacy screen 606 is built onto internal rails to deploy and stow the device. The privacy screens 606 can comprise sound absorbing materials and be carried by structural rails and/or bars to provide a telescoping action. Still further, in alternative embodiments, the privacy screens 606 can comprise touch sensitive film display systems so that flight related information and/or entertainment can be individually delivered to passengers. Further, the privacy screens can comprise a microphone and/or camera to assist a passenger in participating in a video conference while in flight, but in relative privacy.

Figure 13:
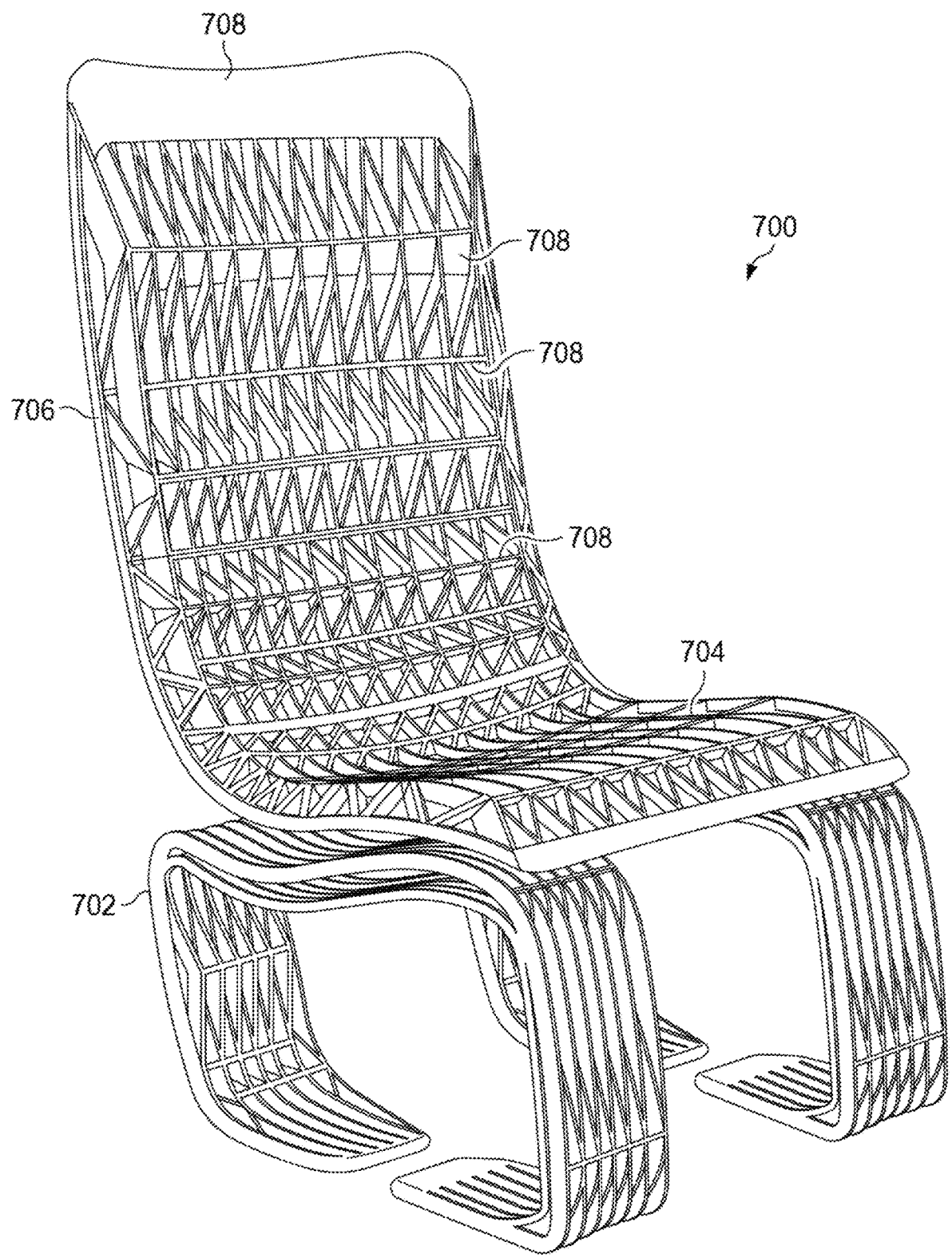
FIG. 13 is an oblique view of a 3D printed truss seat.
Figure 14:
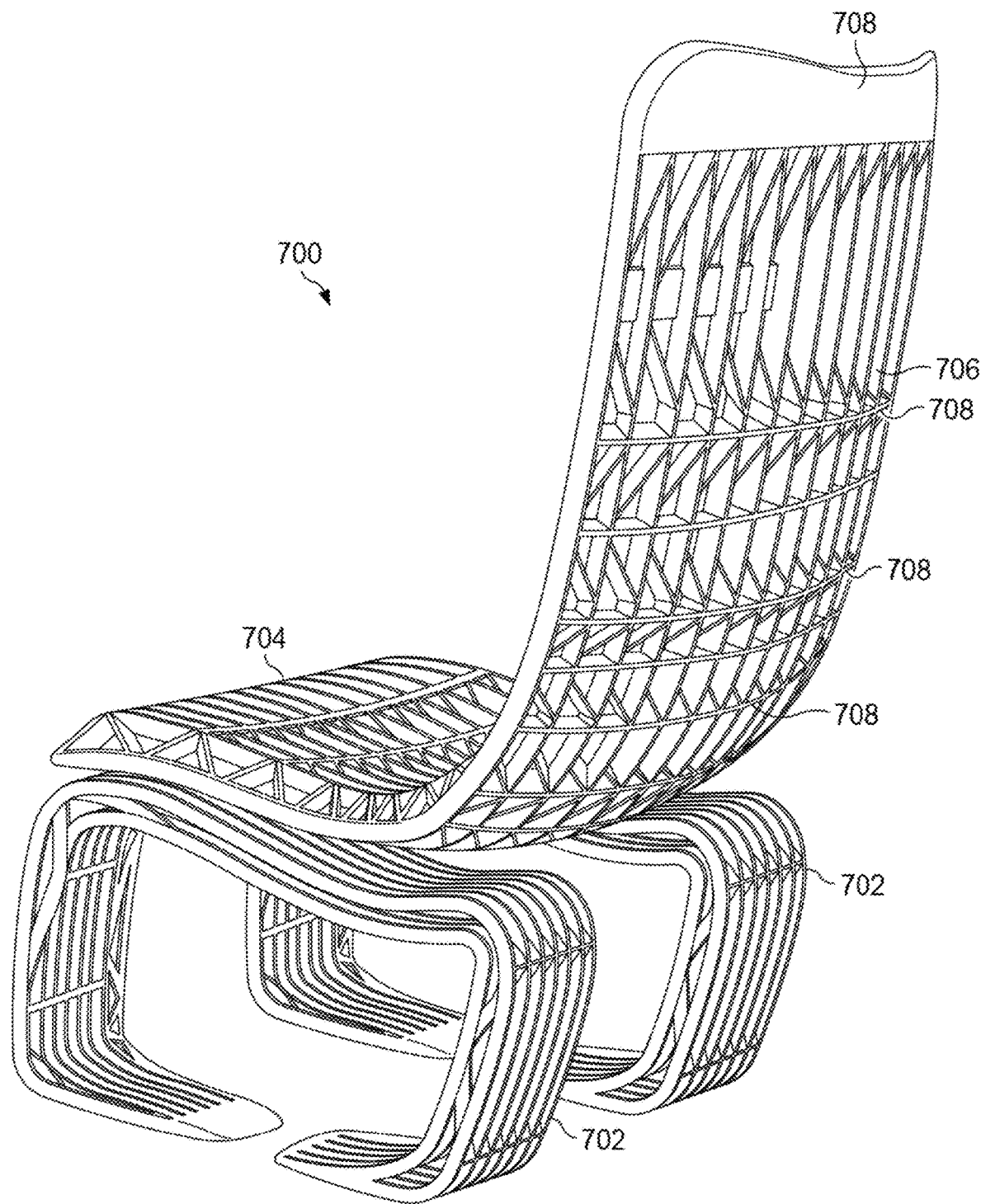
FIG. 14 is another oblique view of the seat of FIG. 13.

Referring now to FIGS. 13 and 14, an embodiment of a 3D printed truss seat 700 is shown. Seat 700 generally comprises base legs 702, a seat 704, a back rest 706. In this embodiment, seat 700 comprises zonal densities of structure. For example, near the top of back rest 706 the vertical spacing of adjacent lateral bars 708 is at a maximum while such spacing is decreased toward a curved pan portion of the seat 700. Such zonal variation in lateral bars, webbing, and other elements can provide strength and stiffness to areas of the seat 700 that need higher strength and stiffness while providing only the necessary strength and stiffness to other portions of the seat 700. The structural elements of seat 700 are also engineered to provide shock attenuation/absorption, to be lighter than conventional seats, and relatively more breathable than conventional seats. This seat has geometry changes from relatively more open at the top of the seat to tighter at the bottom. This structure allows compression when needed for impact protection.

Figure 15:
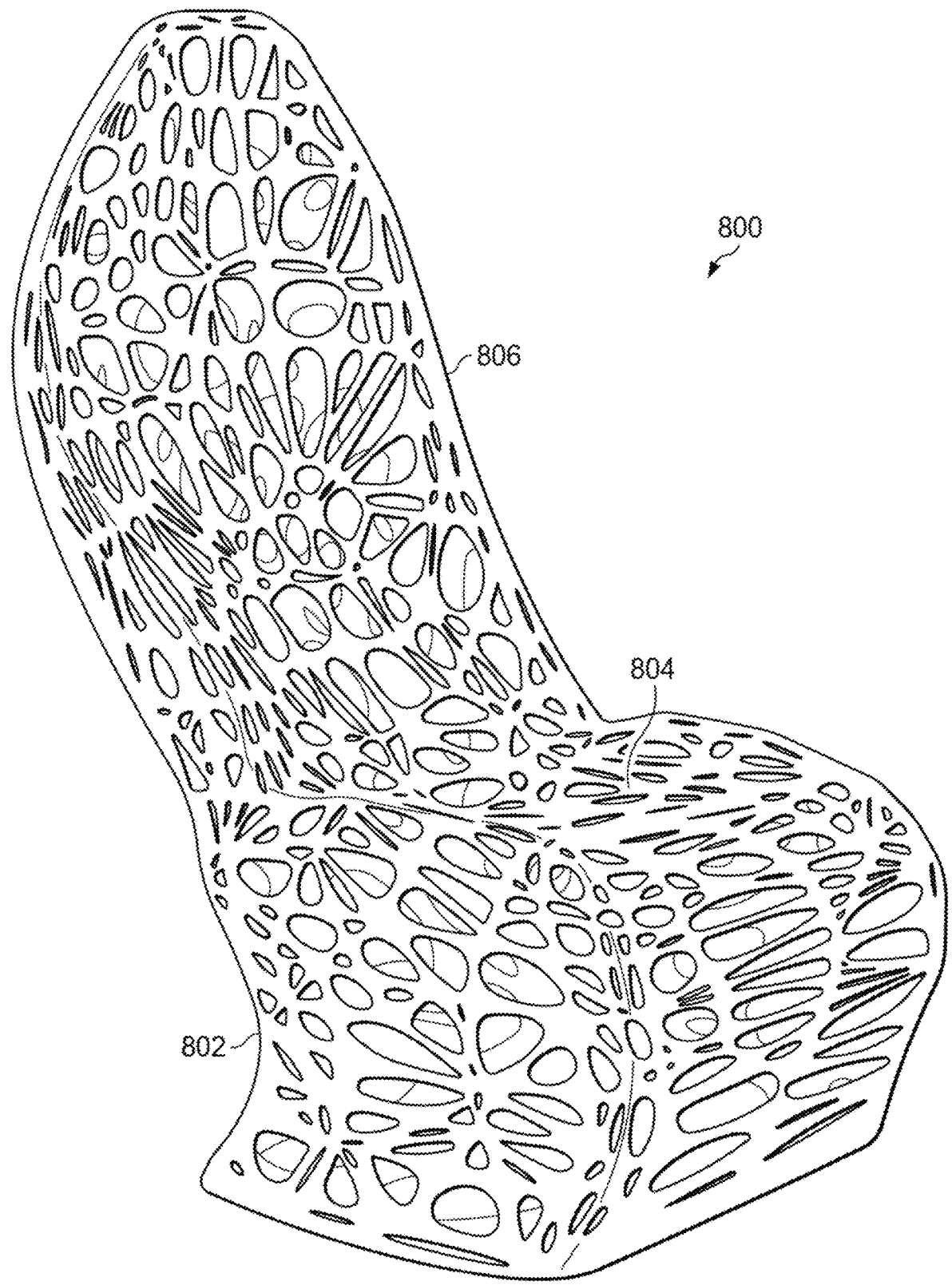
FIG. 15 is an oblique view of a 3D printed organic structure seat.
Figure 16:
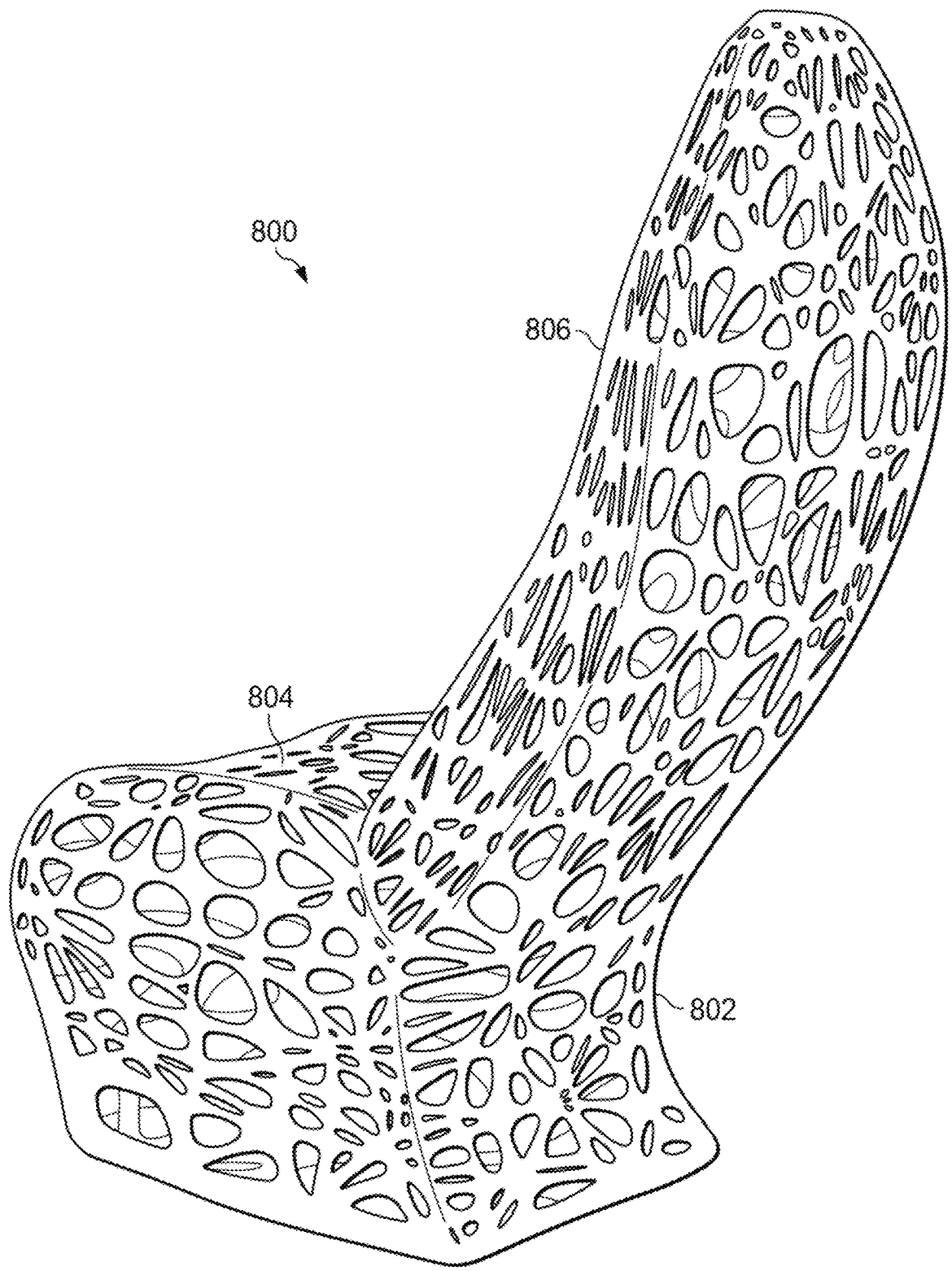
FIG. 16 is another oblique view of the seat of FIG. 15.

Referring now to FIGS. 15 and 16, an embodiment of a 3D printed lattice seat 800 is shown. Seat 800 comprises a lattice structure (organic or organic inspired) and the geometry of the structure is tighter and more closed around the edges and relatively looser and more open in the center panels which provides a structure that is also capable of providing additional impact safety. Seat 800 generally comprises a base 802, a seat 804, and a back rest 806. The structural elements of seat 800 are also engineered to provide shock attenuation/absorption, to be lighter than conventional seats, and relatively more breathable than conventional seats. One or more of the features and/or characteristics of seat 700 and/or seat 800 can be incorporated into the base 402.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A seat, comprising:
a nonplanar surface profile and at least one of (1) a seat display system carried by the seat and configured to conform to the nonplanar surface profile, wherein the seat display system is configured to change display of an image as a function of a location of a user relative to the nonplanar surface profile, (2) a seat display system carried by the seat and configured to conform to the nonplanar surface profile, wherein the seat display system is configured to display an image depicting an appearance of depth as a function of a curvature of the nonplanar surface profile, and (3) a touch sensitive input system carried by the seat and configured to conform to the nonplanar surface profile.

2. The seat of claim 1, wherein a privacy screen of the seat carries a privacy screen display system.

3. The seat of claim 1, wherein the seat display system is carried by a privacy screen.

4. The seat of claim 3, wherein the privacy screen is carried by rails.

5. An aircraft, comprising:
a seat, comprising:
a nonplanar back surface profile and at least one of (1) a seat display system carried by the seat and configured to conform to the nonplanar surface profile, wherein the seat display system is configured to change display of an image as a function of a location of a user relative to the nonplanar surface profile, (2) a seat display system carried by the seat and configured to conform to the nonplanar surface profile, wherein the seat display system is configured to display an image depicting an appearance of depth as a function of a curvature of the nonplanar surface profile, and (3) a touch sensitive input system carried by the seat and configured to conform to the nonplanar surface profile.

6. The aircraft of claim 5, wherein a privacy screen of the seat carries a privacy screen display system.

7. The aircraft of claim 5, wherein the seat display system is carried by the privacy screen.

8. The aircraft of claim 7, wherein the privacy screen is carried by rails.

9. The aircraft of claim 5, wherein the seat display system is configured to display information about the aircraft or operation of the aircraft.

10. The aircraft of claim 6, wherein the privacy screen display system is configured to display information about the aircraft or operation of the aircraft.

11. An aircraft, comprising:

a seat comprising a 3D printed parametrically determined impact absorption base.

12. The aircraft of claim 11, wherein the base comprises zones of at least one of different material, different mechanical properties, and different repeated geometric shapes.

13. The seat of claim 1, wherein the seat display system comprises a film.

14. The seat of claim 1, wherein the touch sensitive input system comprises a film.

15. The seat of claim 5, wherein the seat display system comprises a film.

16. The seat of claim 5, wherein the touch sensitive input system comprises a film.

* * * * *